United States Patent [19]

Hensing et al.

[11] Patent Number: 5,239,532
[45] Date of Patent: Aug. 24, 1993

[54] DRIVE ARRANGEMENT FOR THE WRITING/READING HEADS OF A MAGNETO-OPTICAL DISC APPARATUS

[75] Inventors: Johannes M. M. Hensing; Cornelius A. Hezemans, both of Eindhoven, Netherlands

[73] Assignee: U.S. Philips Corporation, New York, N.Y.

[21] Appl. No.: 925,233

[22] Filed: Aug. 3, 1992

Related U.S. Application Data

[63] Continuation of Ser. No. 452,987, Dec. 19, 1989, abandoned.

[30] Foreign Application Priority Data

Mar. 28, 1989 [NL] Netherlands ............ 8900751

[51] Int. Cl.$^5$ ............ G11B 11/10; G11B 13/04
[52] U.S. Cl. ............ 369/215; 369/13; 369/75.1; 369/219; 360/59; 360/114
[58] Field of Search ........ 360/114, 59; 365/122; 369/13, 213, 215, 217, 219, 75.1, 75.2, 258

[56] References Cited

U.S. PATENT DOCUMENTS

| 4,829,508 | 5/1989 | Arita | 369/244 X |
| 4,993,009 | 2/1991 | Shiho | 369/13 |

FOREIGN PATENT DOCUMENTS

| 0268311 | 5/1988 | European Pat. Off. |
| 0307130 | 3/1989 | European Pat. Off. |
| 3723134 | 1/1988 | Fed. Rep. of Germany |
| 61-258354 | 5/1986 | Japan |
| 63-46642 | 2/1988 | Japan | 360/114 |
| 63-187443 | 5/1988 | Japan |
| 63-263651 | 10/1988 | Japan |
| 01-066848 | 3/1989 | Japan |
| 01-102760 | 4/1989 | Japan |
| 2192750 | 1/1988 | United Kingdom |

OTHER PUBLICATIONS

Deguchi et al., "Digital Magnetoptic Disk Drive", Nov. 1984, pp. 3972-3978, *Applied Optics*, vol. 23, No. 22.

*Primary Examiner*—Stuart S. Levy
*Assistant Examiner*—Joseph A. Rhoa
*Attorney, Agent, or Firm*—David R. Treacy

[57] ABSTRACT

A device for inscribing and/or reading a magneto-optical disc (7), including a frame (1) carrying a turntable (5) which is rotatable about an axis of rotation (11), a slide (17) carrying an optical unit (19) a rectilinear guide (15) for the slide arranged on the frame, and a slide-drive unit (25). A sub-frame (3) is secured to the frame so as to be movable, and a further slide (57) to which, viewed along the axis of rotation, a magnetic unit (59) is secured at a location opposite to and spaced from the optical unit. The sub-frame carries a further rectilinear guide (55) for the further slide, which further rectilinear guide extends parallel to the rectilinear guide for the first-mentioned slide at least during operation.

18 Claims, 7 Drawing Sheets

DRIVE ARRANGEMENT FOR THE WRITING/READING HEADS OF A MAGNETO-OPTICAL DISC APPARATUS

This is a continuation of application Ser. No. 07/452,987, filed Dec. 19, 1989, now abandoned.

CROSS-REFERENCE TO RELATED APPLICATIONS:

United States co-pending application Ser. No. 07/452,986 by the inventors herein has an identical disclosure of preferred embodiments but claims a different invention.

BACKGROUND OF THE INVENTION

1. Field of the Invention

The invention relates to a device for inscribing and/or reading a magneto-optical information carrier, comprising a frame with a turntable which is rotatable about an axis of rotation for supporting the information carrier, a slide comprising an optical unit, which includes an objective for concentrating a radiation beam to form at least one radiation spot in a focusing plane, rectilinear guide means for the slide, arranged on the frame, a slide drive unit, and a movable magnetic unit which, viewed along said axis of rotation, is arranged opposite to and spaced from the optical unit for generating a magnetic field which extends into said focusing plane.

2. Description of the Related Art

Such a device is known from German Offenlegungsschrift DE 37 23 134 (herewith incorporated by reference). Such prior-art device for magneto-optically inscribing a magneto-optical disc comprises a housing having a cover which can be opened and closed to insert or remove a magneto-optical disc. During operation the magneto-optical disc loaded into the housing is held on a turntable by a disc-pressure member and is rotated by a drive motor. The drive motor is secured to a frame accommodated in the housing. The housing further accommodates a slide which is movable over rectilinear guide means of the frame in a radial direction relative to the axis of rotation of the turntable. The slide is constructed as a tilted U-shaped part having two mutually parallel radial limbs. One of the limbs carries an objective lens for concentrating a radiation beam to form a radiation spot and the other limb carries a permanent magnet for producing a magnetic bias field. The objective lens and the magnet are arranged opposite one another and are each situated at one side of the magneto-optical disc which is supported by the turntable.

An information carrier to be used for magneto-optical recording is provided with a thin film of a ferromagnetic or a ferrimagnetic material having a direction of easy magnetisation perpendicular to the surface of the thin film. During recording it is necessary that the thin film be heated to a temperature above the Curie temperature, or in the case of ferri-magnetic materials to a temperature above the so-called compensation point. Recording can effected in accordance with two methods. In accordance with a first method, for which the known device can be used, a constant magnetic bias field is applied by means of a permanent magnet and the thin film is heated by means of a pulsating laser beam. In accordance with a second method the thin film is locally heated by means of a continuous-wave or pulsed laser beam and a pulsating magnetic field is applied at the location of the thin film heated by the laser beam. The pulsating magnetic field is generated by means of an energised coil. The information recorded by means of either method is read optically, utilising the Kerr effect.

The known device cannot readily be adapted to the second of these methods of magneto-optical recording. In principle, it is conceivable to replace the permanent magnet by a coil, but if it is required to record a large amount of information per unit of time the magnetic flux in the coil has to be minimised. A consequence of this is that the magnetic field which is produced is comparatively small, so that the coil should be arranged at a very short distance from the information carrier. Such a spacing is possible only if the coil is incorporated in an actuator for moving the coil in a direction parallel to the axis of rotation of the turntable. It is found that the U-shaped construction of the slide in the known device causes undesirable dynamic problems during energisation of the actuator. The comparatively compliant construction of the known slide can be stiffened by using a heavier construction for the slide; but this has the drawback that the mass of the slide becomes impermissibly large, and is incompatible with fast access times.

SUMMARY OF THE INVENTION

It is an object of the invention to provide a device of the type defined in the opening paragraph which, regardless of the method of magneto-optically inscribing an information carrier, does not cause any dynamic problems and access-times problems.

In accordance with the invention the device comprises a sub-frame secured to the frame and a further slide, to which the magnetic unit is secured. The sub-frame is provided with a further rectilinear guide means for the further slide. The further rectilinear guide means, at least during operation, extends parallel to the rectilinear guide means for the first-mentioned slide. An advantage of the device in accordance with the invention is that both slides can be of a light-weight construction, so that fast access times are attainable, although the sub-frame can be of construction which is adequately stiff to preclude dynamic problems.

Another disadvantage of the device known from the above-identified West German patent is that the rectilinear guide means must be comparatively long and, consequently, the housing must be comparatively deep in order to enable the information carrier to be placed on and removed from the turntable. An embodiment of the device in accordance with the invention, which does not have this problem, is characterized in that the sub-frame is secured to the frame so as to be movable, in particular pivotable. This enables the length of the rectilinear guide means for the slides to be reduced without making it more difficult to place the information carrier, which may be accommodated in a cassette, on or remove it from the turntable.

An embodiment which structurally and effectively ensures that the magnetic field produced by the magnetic unit extends at the location of the radiation spot formed in the focusing plane by the objective, which plane coincides with the information plane of the information carrier, is characterized in that the device comprises coupling means for coupling the slides to one another.

An embodiment which is of surprisingly simple mechanical construction is characterized in that the coupling means comprise a projecting member arranged on one of the slides and a stop arranged on the other slide to cooperate with said projecting member. The stop may then be constituted by a part bounding an opening.

Another embodiment is characterized in that the coupling means comprise a double-hinged link secured to both slides. In this way the slides are interconnected without lost motion, the hinge construction obviously interconnecting the slides rigidly in a radially direction and, in the case of a pivotable frame, the slides being coupled to one another to as to be movable in the pivoting direction.

Another embodiment is characterized in that the coupling means comprise a transmission mechanism cooperating with the slide-drive unit. The transmission mechanism may comprise gear wheels and/or belts. This embodiment does not require any constructional provisions to couple the slides to one another. This has the advantage that the slide carrying the optical unit does not requires any further adaptation for use in both a magneto-optical player and in an optical player not comprising a magnetic unit, for example a CD player. This commonality permits a modular construction of the players and hence an enlarged production series, which may reduce the cost.

An embodiment by means of which very short access times can be obtained is characterized in that the device comprises a further slide-drive unit for driving the further slide, and a measurement and control system for positioning the optical unit and the magnetic unit relative to one another in the direction of driving, at least during operation. In this way the slides can each be driven separately. Driving is possible by means if, for example, two stepping motors, two d.c. motors or a combination of these two types of motor.

A further embodiment is characterized in that the measurement and control system comprises an optical distance meter which is arranged on one of the slides to cooperate with a reflecting surface of the other slide. The distance meter is connected to an electronic control unit, which may be either a digital or an analog unit. An incremental measurement ruler with associated detector may be arranged near one of the drive units of the slides.

An embodiment comprising only a limited number of different parts is characterized in that an incremental measurement ruler and an optical detector of the measurement and control system are arranged near each of the drive units. These detectors are electronically coupled to one another by a microprocessor.

An embodiment, in which the device comprises a pressure member for pressing the information carrier onto the turntable during operation, is characterized in that the pressure member is secured to the sub-frame. This embodiment has the advantage that no additional supporting element for the pressure member is needed. Another important advantage of this embodiment is that at the location of the pressure member a supporting point for the sub-frame is obtained, which contributes significantly to the stiffness of the sub-frame during operation.

It is to be noted that the composition and the characteristics of a magneto-optical information carrier are described in Applied Optics, Vol. 23, no. 22, Nov. 15, 1985, pp. 3972-3978; Digital Magneto-optic disc drive, T. Deguchi c.s. (herewith incorporated by reference).

BRIEF DESCRIPTION OF THE DRAWING

The invention will now be described in more detail, by way of example, with reference to the accompanying drawings in which.

DESCRIPTION OF THE PREFERRED EMBODIMENT

Figure 1:
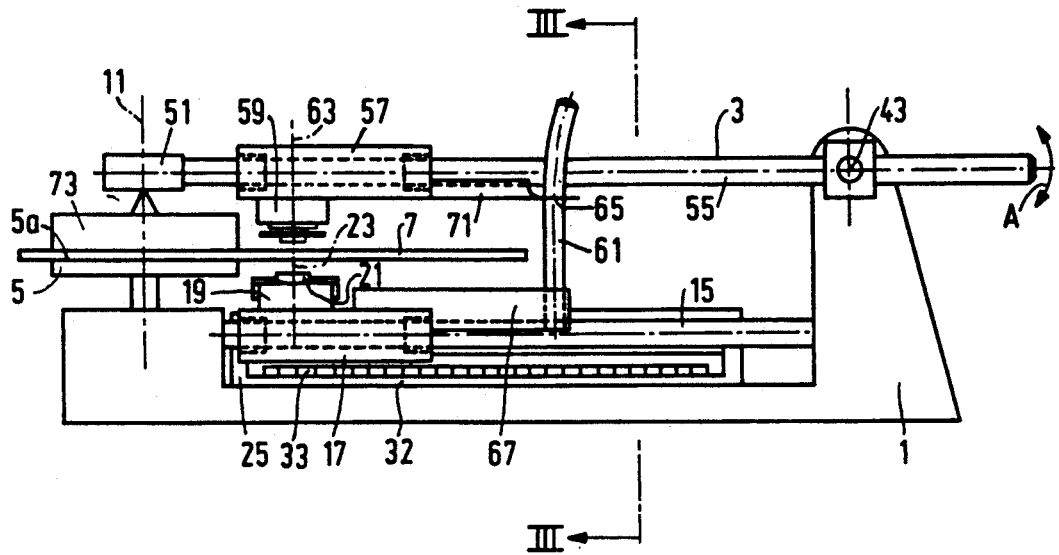
FIG. 1 is a diagrammatic side view of a first embodiment of the device in accordance with the invention.
Figure 2:
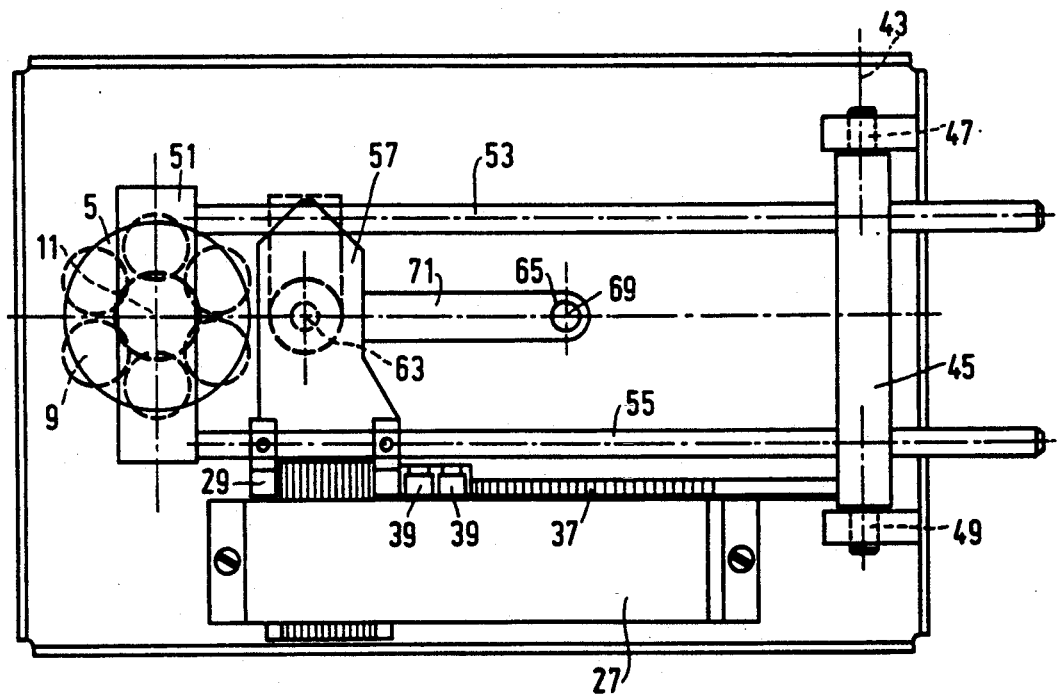
FIG. 2 is a plan view of the embodiment shown in FIG. 1.
Figure 3:
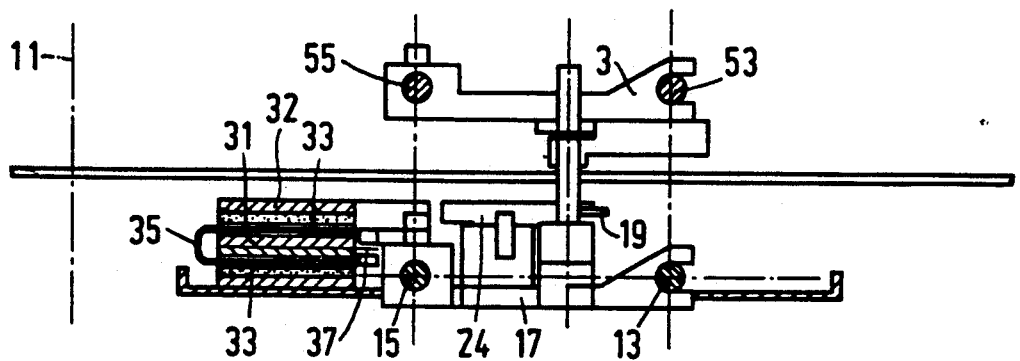
FIG. 3 is a sectional view taken on the line III—III in FIG. 1.

The device in accordance with a first embodiment of the invention is shown in FIGS. 1, 2 and 3, and comprises a frame 1 and a pivotable sub-frame 3. A turntable 5 for supporting and centering a disc-shaped magneto-optical information carrier 7 is arranged in the frame 1. For this purpose the turntable 5 comprises a supporting surface 5a and a centering cone, not shown. An electric motor 9 secured in the frame 1 serves to rotate the turntable 5 about an axis of rotation 11, a speed of for example 2400 revolutions per minute being attainable. Two guide spindles 13 and 15 are arranged on the frame 1 to form rectilinear guide means for a slide 17. The guide spindles 13 and 15 extend parallel to one another and are oriented in such a way that the slide 17 can perform a radial movement relative to the axis of rotation 11 between a position near the turntable and a position remoter from the turntable. The slide 17 carries an optical unit 19, comprising an optical lens or objective 21 having an optical axis 23 and an electromagnetic actuator for driving the objective 21. The electromagnetic actuator may be of a type as is disclosed in European Patent Application 0,268,311 which corresponds to U.S. Pat. No. 4817076 issued May 31, 1988, hereby incorporated by reference). The objective 21 serves for focusing a radiation beam from a radiation source, not shown, for example a laser, to form a radiation spot in the information plane of the information carrier 7. The radiation source may be situated on the slide 17 or elsewhere, for example on the frame 1.

During operation the slide 17 is driven by a linear motor 25, comprising a stator 27 and a movable armature 29. The stator 27 comprises central stator plates 31 and end plates 32 with magnets 33 and is secured to the frame 1. The armature 29 comprises armature coils 35 and is secured to the slide 17. The linear motor 25 may be constructed as a stepping motor. If the motor is not constructed as a stepping motor, as in the present embodiment, the device may comprise an optical ruler 37 secured to the stator 27 and a set of optical emitters and receivers 39 cooperating with said rulers and secured to the armature 29 to detect the position of the slide 17.

The sub-frame 3 is pivotable about a pivotal axis 43 defined by a shaft 45 having two journals 47 and 49 which are supported in the frame 1. The shaft 45 is secured to the sub-frame 3, which comprises two guide spindles 53 and 55 which extend parallel to one another and which are secured to a connecting member 51 of the sub-frame 3. The guide spindles 53 and 55, which extend parallel to the guide spindles 13 and 15 of the frame 1 in the operating position shown, which, provide the rectilinear guidance for a slide 57. The slide 57 carries a magnetic unit 59, comprising an element such as a permanent magnet or an induction coil for generating a magnetic field which extends into the information plane of the information carrier 7. The magnetic unit may further comprise an electro-magnetic actuator for moving the element in a direction perpendicular to the information carrier 7. The magnetic unit 59, to which a magnetic axis 63 can be assigned, is situated opposite to and is spaced from the optical unit 19.

The information carrier 7 is situated between the optical unit 19 and the magnetic unit 59, and at least during operation it is important that the optical axis 23 and the magnetic axis 63 are disposed in line with one another. In order to achieve this, the device comprises coupling means for coupling the slides 17 and 57 to one another. In the present embodiment the coupling means comprise a projecting member 61 secured to the slide 17 and a stop 65 arranged on the slide 57 to cooperate with said member. The member 61 is shaped along part of its length like a portion of a toroid. It is secured to the slide via a slide portion 57 which extends in a radial direction. The stop 65 is constituted by the inner bounding wall of an opening 69 formed in a slide member 71 which extends in a radial direction and which is secured to the slide 57. Relative to the member 61 the opening 69 is dimensioned so as to allow pivotal movements of the sub-frame 3 in directions indicated by the double arrow A.

At the location of the connecting member 51 the sub-frame carries a disc-pressure member 73 for pressing the information carrier 7 onto the turntable 5. To enable the information carrier 7 to be placed on or removed from the turntable the disc-pressure member can be moved away from the turntable 5 by pivoting the sub-frame 3.

In the embodiments to be described hereinafter parts corresponding to those in the first embodiment bear the same reference numerals.

Figure 4:
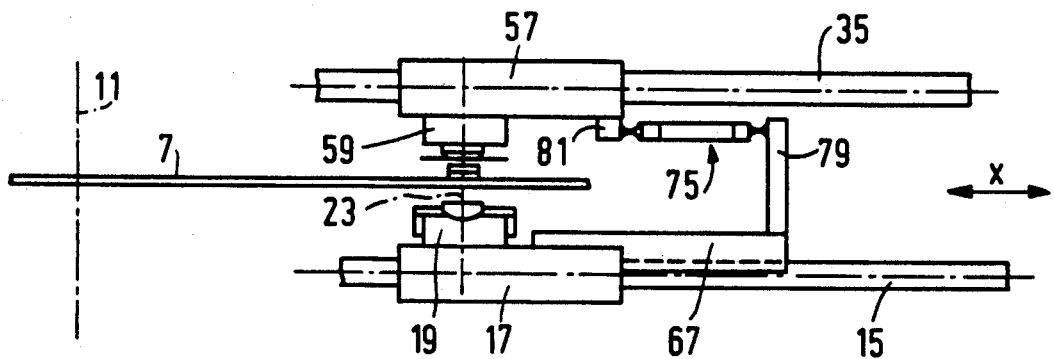
FIG. 4 is a diagrammatic side view showing a part of a second embodiment of the device in accordance with the invention.
Figure 4A:
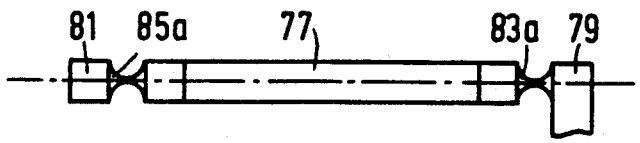
FIG. 4A is a side view showing a part of the second embodiment.
Figure 4B:
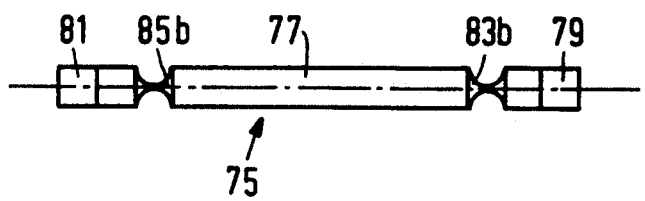
FIG. 4B is a plan view of the part shown in FIG. 4A.

The part of the second embodiment shown in FIG. 4 comprises a slide 17 carrying an optical unit 19 and a slide 57 carrying a magnetic unit 59. The slides 17 and 57 each comprise separate rectilinear guide means, whose respective guide spindles 15 and 55 are shown. The construction of the optical unit 19 and the magnetic unit 59 may correspond to the construction of the relevant units of the device shown in FIGS. 1, 2 and 3. The slide 17 can be driven by a stepping motor or otherwise. The slides 17 and 57 are coupled to each other by means of a double-hinged link 75, which has one end connected to a slide member 67 of the slide 17 and its other end to the slide 57. The link 75 comprises a central elongate portion 77, two end portions 79 and 81, and two pairs of elastic hinges 83A, 83B and 85A, 85B, extending between the parts 77 and 79 and between the parts 77 and 81 respectively. The hinges 83A and 85A have a hinge axis which is oriented transversely of the optical axis of the optical unit 19 and transversely of the direction of movement X of the two slides. The hinges 83B and 85B each have a hinge axis parallel to said optical axis 23. The hinge construction 75 allows a pivotal movement of the slide 57 relative to the slide 17 and is sufficiently rigid in the X direction to guarantee an accurately defined coupling between the two slides 17 and 57.

Figure 5:
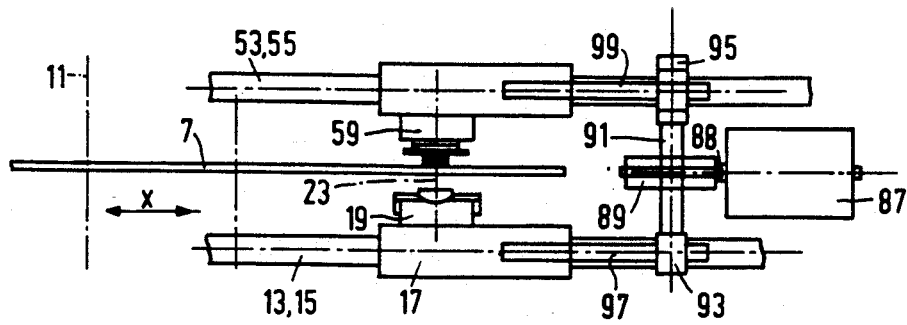
FIG. 5 is a diagrammatic side view showing a part of a third embodiment of the device in accordance with the invention.

The part of the third embodiment of the device in accordance with the invention shown in FIG. 5, like the preceding embodiments, comprises a frame and a sub-frame which is secured to the relevant frame so as to be translatable or pivotable. The device comprises a slide 17 carrying an optical unit 19 and a slide 57 carrying a magnetic unit 59. Both slides are moved over rectilinear guide means, bearing the reference numerals 13, 15 and 53, 55, parallel to an information carrier 7 which extends between the two units 19 and 59. An electric motor 87 secured to the frame provides the drive for the two slides 17 and 57. The motor 87 comprises a motor shaft 88, which cooperates with a transmission mechanism 89, for example a worm wheel and gear wheel transmission which cooperates with a drive shaft 91. At each end the drive shaft 91, which extends parallel to the optical axis 23 of the optical unit 19, carries a pinion 93 and 95 respectively. The slide 17 is provided with a gear rack 97 which extends in the driving direction X and the slide 57 is provided with a gear rack 99 which extends parallel thereto. Since the gear rack 97 cooperates with the pinion 93 and the gear rack 99 cooperates with the pinion 95, the slides 17 and 57 can be moved concurrently and synchronously by one motor, so that the desired radial position of the optical unit 19 and the magnetic unit 59 relative to one another is guaranteed during operation.

Figure 6:
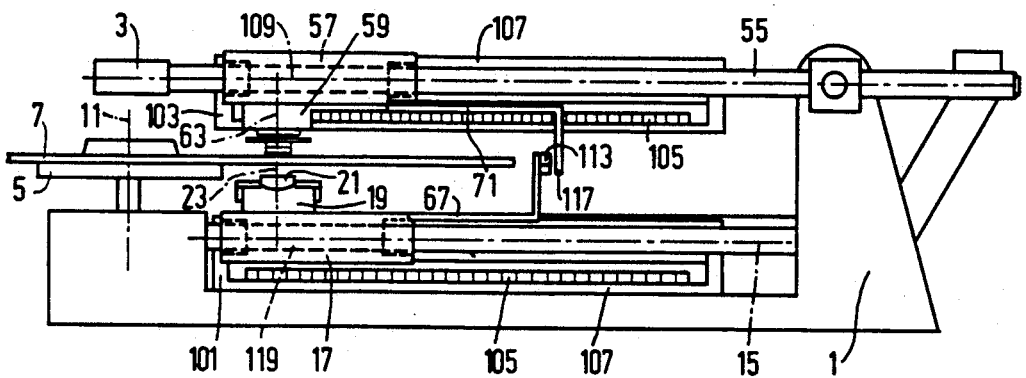
FIG. 6 is a diagrammatic side view of a fourth embodiment of the device in accordance with the invention.
Figure 7:
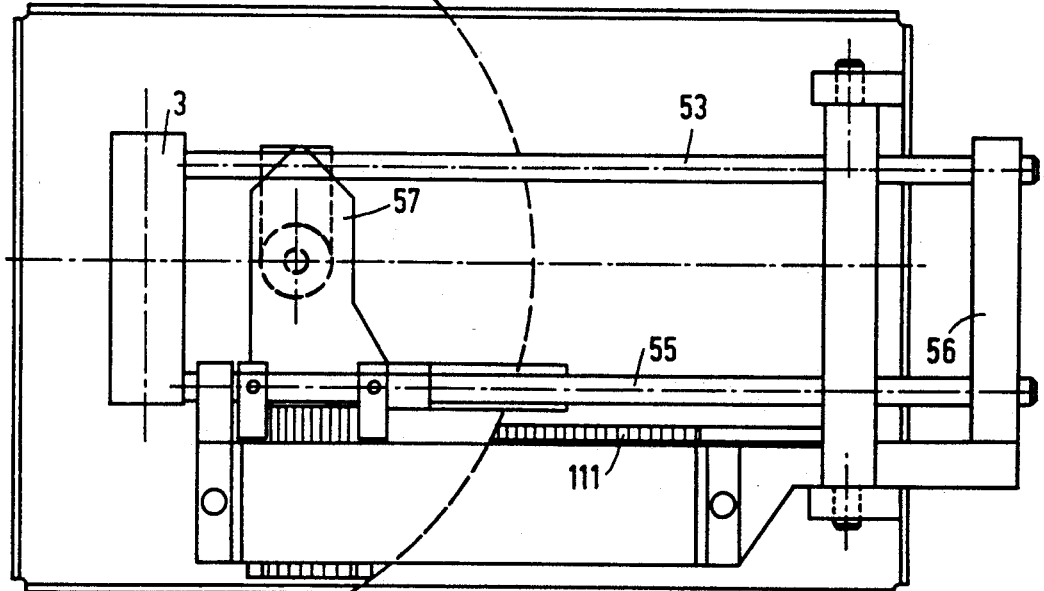
FIG. 7 is a plan view of the embodiment shown in FIG. 6.

The fourth embodiment of the device in accordance with the invention shown in FIGS. 6 and 7 comprises a frame 1 comprising two parallel guide spindles, of which only one spindle, bearing the reference numeral 15, is shown, and a pivotable sub-frame 3 comprising two guide spindles 53 and 55, which engage against a stop element 56 of the frame 1 during operation. The guide spindles of the frame 1 serve for guiding and supporting a slide 17 and the guide spindles 53 and 55 serve for guiding and supporting a slide 57. The slide 17 carries an optical unit 19 comprising an objective 21 having an optical axis 23 and an electro-magnetic actuator for moving the objective along the optical axis 23. A magnetic unit 59 having a magnetic axis 63 is suspended from the slide 57. A turntable 5, which is supported in the frame 1, carries a magneto-optical information carrier 7 at least during operation. The slides 17 and 57 are driven in radial directions independently of one another. For this purpose each slide is coupled to a linear motor 101 and 103 respectively. Both motors 101 and 103 each comprise a stator, having a magnet 105 and a stator yoke 107, and an armature, having one or more coils 109. For the purpose of position detection one of the two motors, for example the linear motor 101 is provided with an incremental measurement ruler 111 and an optical sensor which cooperates therewith. In order to guarantee an optimum cooperation between the optical unit 19 and the magnetic unit 59 during recording on the magneto-optical information carrier 7 the device comprises a measurement and control system 20 for positioning the optical unit and the magnetic unit relative to one another at least during operation. The measurement and control system comprises an optical distance meter (opto-coupler) 113 arranged on a slide member 67 of the slide 17 and a reflecting surface 117 arranged on a slide member 71 of the slide 57. The optical distance meter 113 is arranged opposite the reflecting surface 117 and is connected to an electronic control unit.

Figure 8:
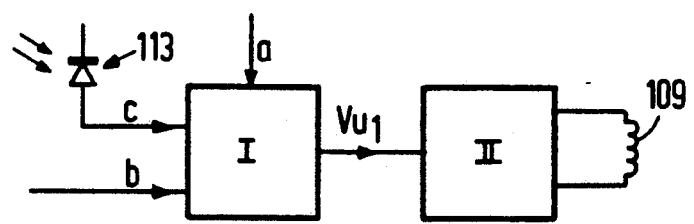
FIG. 8 shows diagrammatically the measurement and control system employed in the fourth embodiment.

The measurement and control system employed in the device shown in FIGS. 6 and 7 will be described in more detail with reference to FIG. 8. A signal a from a player control system is applied to a controller I to establish the correct initial conditions such as bringing the reflecting surface within the measurement range of the opto-coupler after the device has been switched on. Moreover, a signal b corresponding to the desired slide position (set-point) is applied to the controller I. The optical distance meter 113 supplies a signal c to the controller I, the value of this signal being dependent on the distance from the reflecting surface 117. In the controller I the signal c is compared with the signal b, the controller ensuring that the system has the desired stability and that the slides 17 and 57 are accurately in track with one another. The controller I supplies an output voltage Vu1 to an output amplifier II, which drives the coil 109 of the linear motor 103.

Figure 9:
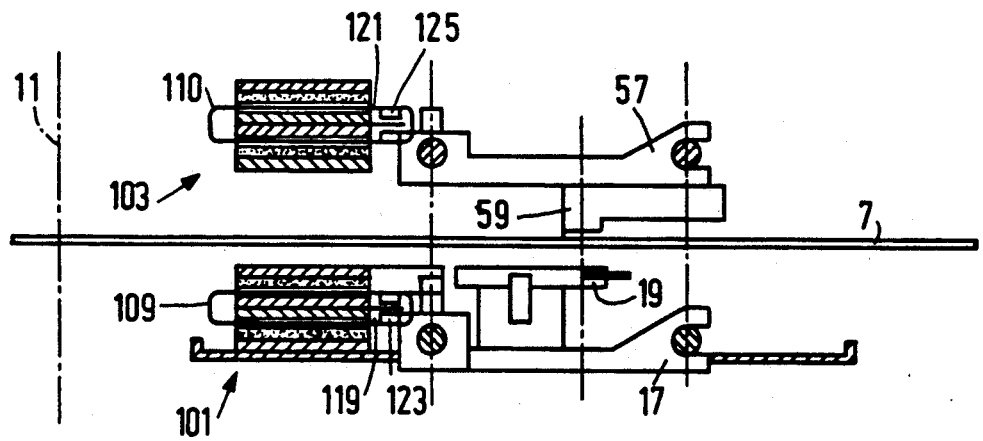
FIG. 9 is a diagrammatic cross-sectional view showing a part of a fifth embodiment of the device in accordance with the invention.

The part of the fifth embodiment of the device in accordance with the invention shown in FIG. 9 comprises a slide 17 carrying an optical unit 19 and a slide 57 carrying a magnetic unit 59. The two slides are guided similarly to those in the embodiments already described hereinbefore. Each slide is driven by a separate linear motor, 101 and 103 respectively, each motor being provided with an incremental measurement ruler 119 and 121 respectively and an optical detector 123 and 125 cooperating therewith. The optical detectors 123 and 125 each have two emitters at one side of the relevant optical incremental ruler and two receivers at the other side of the relevant ruler and are electronically coupled to one another by a microprocessor.

Figure 10:
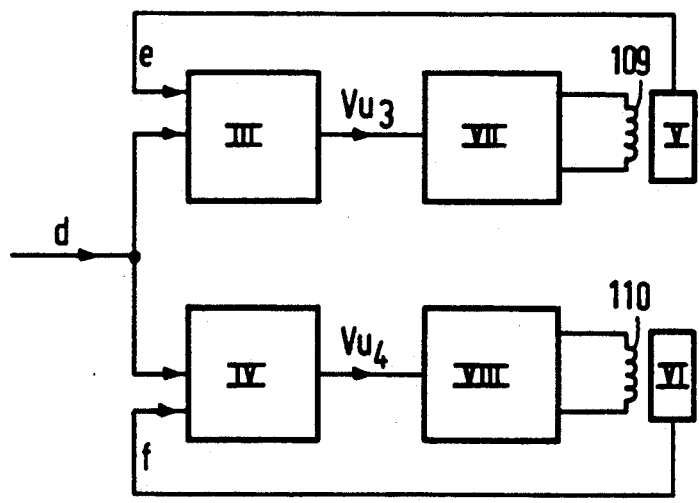
FIG. 10 shows diagrammatically the measurement and control system used in the fifth embodiment.

The measurement and control system of the device shown in FIG. 9 will be described in greater detail with reference to FIG. 10. The measurement and control system comprises two controllers III and IV, a player control system supplying a signal d related to the desired slide position to each of said controllers. A position-measurement unit represented by V and VI, is coupled to the controllers III and IV respectively. From the position-measurement unit V the controller III receives a signal e which is related to the actual position of the slide 17 and from the position-measurement unit VI the controller IV receives a signal f which is related to the actual position of the slide 57. The controllers III and IV provide the desired stability of the two parallel sub-systems and the desired tracking accuracy, the signals d and e being compared with one another in the controller III and the signals d and f being compared with one another in the controller IV. The controllers III and IV apply an output voltage Vu3 and Vu4 respectively to an output amplifier VII and VIII respectively. The output amplifier VII energises the coil 109 of the linear motor 101 and the output amplifier VIII energises the coil 110 of the linear motor 103.

Figure 11:
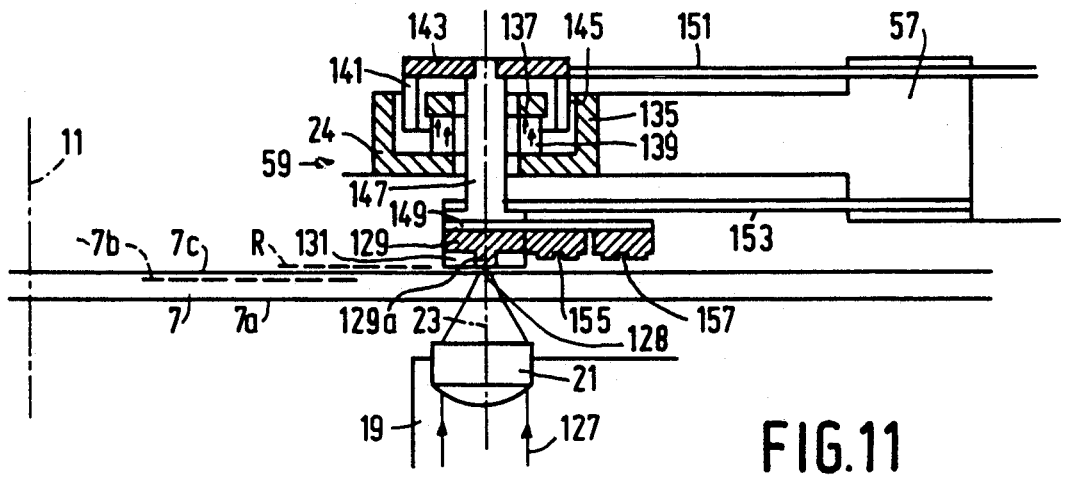
FIG. 11 is a diagrammatic longitudinal sectional view showing a part of a sixth embodiment of the device in accordance with the invention.

The embodiment of the device in accordance with the invention which is shown in part in FIG. 11, is a modification of the device shown in FIGS. 1, 2 and 3. Similarly to that described above, it comprises a frame, a sub-frame, a slide carrying an optical unit 19, and a slide 57 carrying a magnetic unit 59. For a comprehensive description of these parts of the device reference is therefore made to the paragraphs relating to FIGS. 1, 2 and 3. FIG. 11 shows the objective 21 of the optical unit 19, which objective has an optical axis 23. The objective 21 is arranged at the transparent side 7a of a magneto-optical disc 7, which is rotatable about an axis of rotation 11. The magneto-optical disc 7 comprises a composite information layer 7b. By means of the objective a radiation beam 127, which is directed to the objective, can be converged to form a radiation spot 128 in the information layer 7b. A magnetic unit 59 is arranged opposite the objective 21 at the other side of the optical information carrier 7. In this embodiment the magnetic unit comprises a coil 131, arranged on a coil former or support 129, and an electro-magnetic actuator 24 for moving the coil 131 in a direction parallel to the axis of rotation 11 of the turntable 5 (FIG. 1). The support 129 is suitably made of a ferrite and has a central portion 129a which is directed towards the objective 21 and which carries the coil 131. When the coil 131 is energised a magnetic field is produced such that the lines of field emerge from the central portion 129a and intersect the information layer 7b substantially perpendicularly.

The actuator 24 comprises an axially magnetised magnet 139 arranged between magnetically conductive portions 135 and 137. The actuator 24 further comprises an actuator coil 141, which is secured to a coil holder 143 and which is axially movable in an annular air gap 145 bounded by the portions 135 and 137. The coil holder 143 is secured to an actuator spindle 147 whose end which is remote from the coil holder 143 is provided with a supporting element 149 to which the support 129 is secured. The actuator portions 135, 137 and 139 are secured directly to the slide 57 and the portions 141, 143, and 147 are together supported by two leaf springs 151 and 153 secured to the slide 57.

The device shown in FIG. 11 further comprises a measurement and control system for determining, during operation of the device, the distance between a reference plane of the magnetic unit 59, for example the side of the coil 131 or the central portion 129a facing the objective and bearing the reference R in the Figure, and the side 7c of the information carrier 7 facing the magnetic unit. The measurement and control system also serves for adjusting the desired position of the coil 131.

The measurement and control system which is used comprises two juxtaposed optical detectors 155 and 157 which are secured to the supporting element 149 and together are situated adjacent the coil 131. The two optical detectors 155 and 157 together form an emitter for emitting an optical beam and two receivers for receiving the radiation reflected from the side 7c of the information carrier 7.

Figure 12:
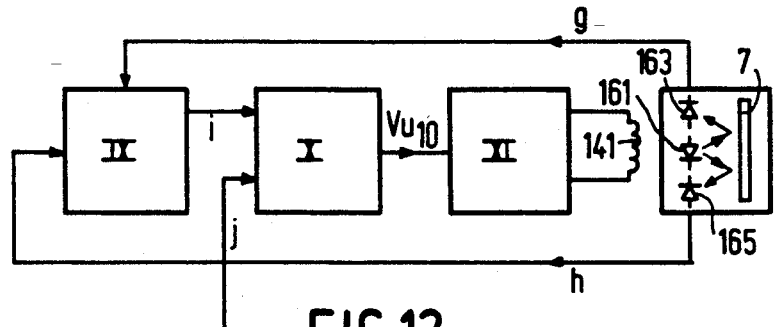
FIG. 12 shows diagrammatically the measurement and control system used in the sixth embodiment.

The measurement and control system used in the device shown in FIG. 11 will be described in greater detail with reference to the block diagram shown in FIG. 12. The emitter mentioned in the preceding paragraph bears the reference numeral 161 and the two receivers bear the reference numerals 163 and 165. The receiver 163 is a reference diode and the receiver 165 is a measurement diode. The magneto-optical information carrier bears the reference numeral 7. A reference current g from the reference diode 163 and a measurement current h from the measurement diode 165 are applied to a unit IX. The unit IX supplies a normalised signal i, which is applied to a controller X. A signal j which is related to the desired position of the coil 131, is applied to the controller X by a player control system. The controller X provides the desired stability of the system and controls the desired distance from the optical disc 7, the signals i and j being compared with one another in the controller X. The controller X supplies an output voltage Vu10 to an output amplifier XI. The coil 141 of the actuator 24 is energised by the output amplifier XI.

Figure 13:
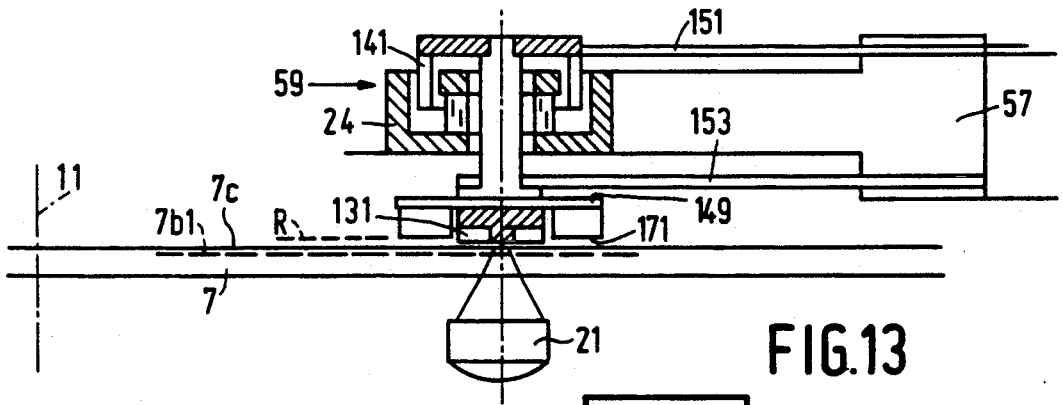
FIG. 13 is a diagrammatic longitudinal sectional view of a part of a seventh embodiment of the device in accordance with the invention.

The embodiment of the device in accordance with the invention, which is shown in part in FIG. 13, is also a modification of the device as shown in FIGS. 1, 2 and 3. The principal difference with the embodiment shown in FIG. 11 is that the present embodiment comprises a capacitive detector 171 instead of the optical detectors 155 and 157. The capacitive detector 171 comprises an electrically conductive ring, for example made of phosphor-bronze, and cooperates with a conductive layer 7b1, which may be one of the constituent layers of the information layer 7b. For the remainder the construction and mechanical operation of this embodiment may be similar to that shown in FIG. 11. For a more detailed description of this embodiment reference is made to the paragraphs relating to FIG. 11. The capacitive detector 171 forms part of a measurement and control system for determining, during operation of the device, the distance between a reference surface of the magnetic unit 59, for example the side of the coil 131 facing the objective 21 and bearing the reference R in the Figure, and the side 7c of the information carrier 7 facing the magnetic unit, the system also serving to control the desired position of the coil 131. The capacitive detector 171 is secured to the supporting element 149 of the actuator 24.

Figure 14:
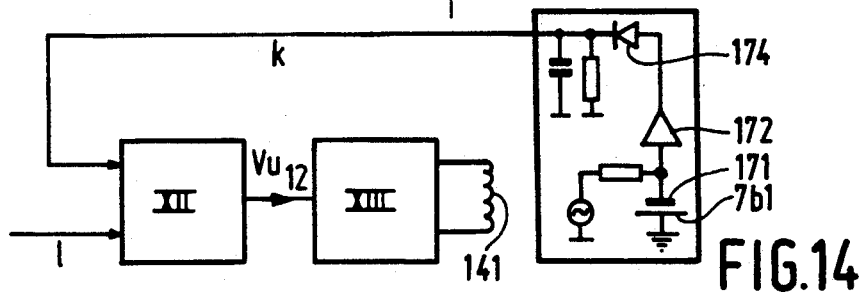
FIG. 14 shows diagrammatically the measurement and control system employed in the seventh embodiment.

FIG. 14 shows the block diagram of the measurement and control system employed in the device shown in FIG. 13. In said Figure the capacitive detector has the reference numeral 171 and the conductive layer of the information carrier bears the numeral 7b1. The detector 171 supplies a measurement signal which is related to the actual position of the coil 131 and which is applied to a buffer amplifier 172 and subsequently rectified by a rectifier 174. The rectified measurement signal k is applied to a controller XII and in the controller XII it is compared with a signal 1 related to the desired position. The controller XII supplies an output voltage Vu12 and is electrically connected to an output amplifier XIII.

The output amplifier XIII energises the coil 141 of the actuator 24.

Figure 15:
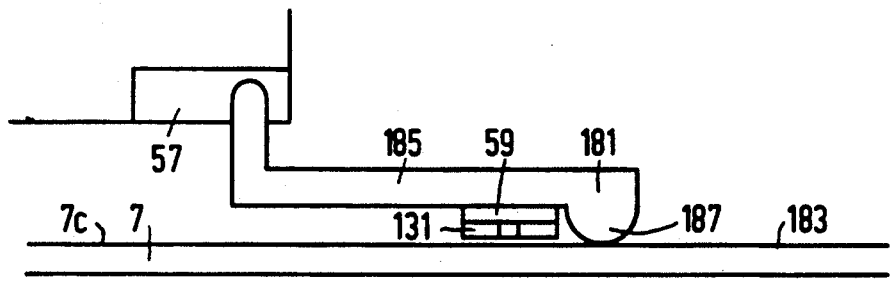
FIG. 15 shows diagrammatically a part of an eighth embodiment of the device in accordance with the invention.

FIG. 15 shows a part of a further embodiment of the invention. This embodiment is again a modification of the device as shown in FIGS. 1, 2 and 3. The measurement and control system in the present embodiment comprises a mechanical detector 181 for cooperation with a peripheral surface 183 of the information carrier 7. The mechanical detector comprises a supporting arm 185 which is pivotally secured to the slide 57 and which carries a slip contact 187 which bears on the information carrier during operation. The supporting arm 185 carries the magnetic unit 59, which comprises a coil 131. During operation the slip contact 187 follows the peripheral surface 183 of the rotating information carrier 7, to detect irregularities in this peripheral surface, which cause a pivotal movement of the supporting arm 185. The coil 131 of the magnetic unit 59, which coil is arranged on the supporting arm 185, follows the movements of the pivotal arm, thereby guaranteeing a predetermined distance between the coil 131 and the peripheral surface 7c of the information carrier 7.

Figure 16:
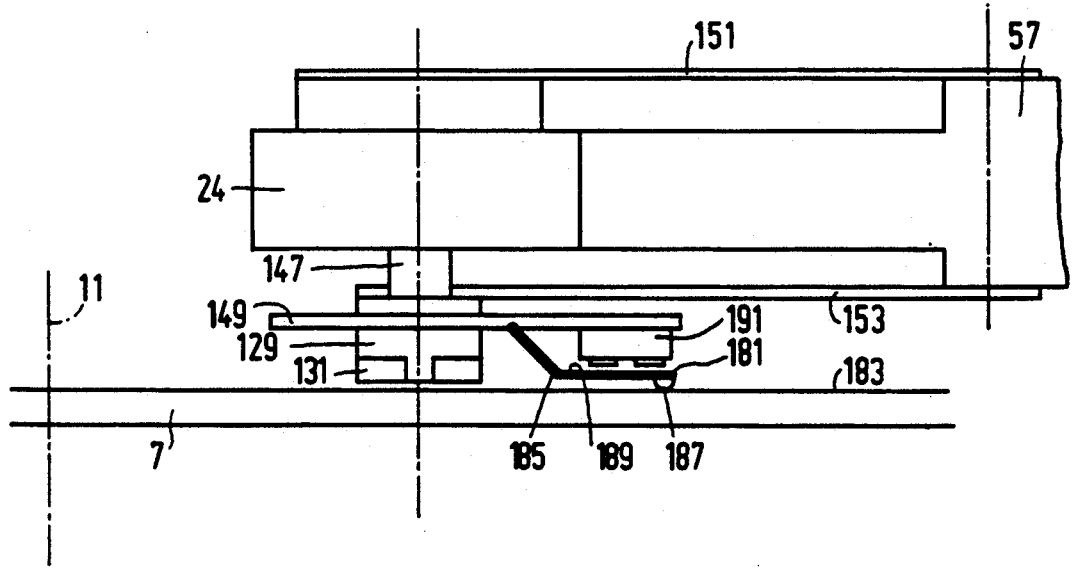
FIG. 16 shows diagrammatically a part of a ninth embodiment of the device in accordance with the invention.

The part of the ninth embodiment of the device in accordance with the invention shown in FIG. 16 is a modification of the part shown in FIG. 11. The present embodiment comprises an actuator 24, which may be of a construction similar to that of the actuator shown in FIG. 11. The actuator 24 is connected partly directly to the slide 57 and partly via two blade springs 151 and 153 and comprises an axially movable actuator spindle 147 with a supporting element 149. The supporting element carries a coil former or support 129, made of for example a ferrite, with a coil 131 for producing a magnetic field. The embodiment further comprises a mechanical detector 181, which is pivotally connected to the supporting element 149 and which is provided with a slip contact 187 which in operation engages with a peripheral surface 183 of a rotating information carrier 7. The mechanical detector 181 further comprises a supporting arm 185 having a reflecting surface 189. An optical sensor 191 secured to the supporting element 149 is arranged opposite the reflecting surface 189 to detect excursions of the slip contact 187. The optical sensor 191 forms part of a measurement and control system for controlling the desired position of the coil 131. The measurement and control system is comparable to the system shown in FIG. 12. Since the reflecting surface 189 can be uniquely defined it is not necessary to provide a reference diode.

Figure 17:
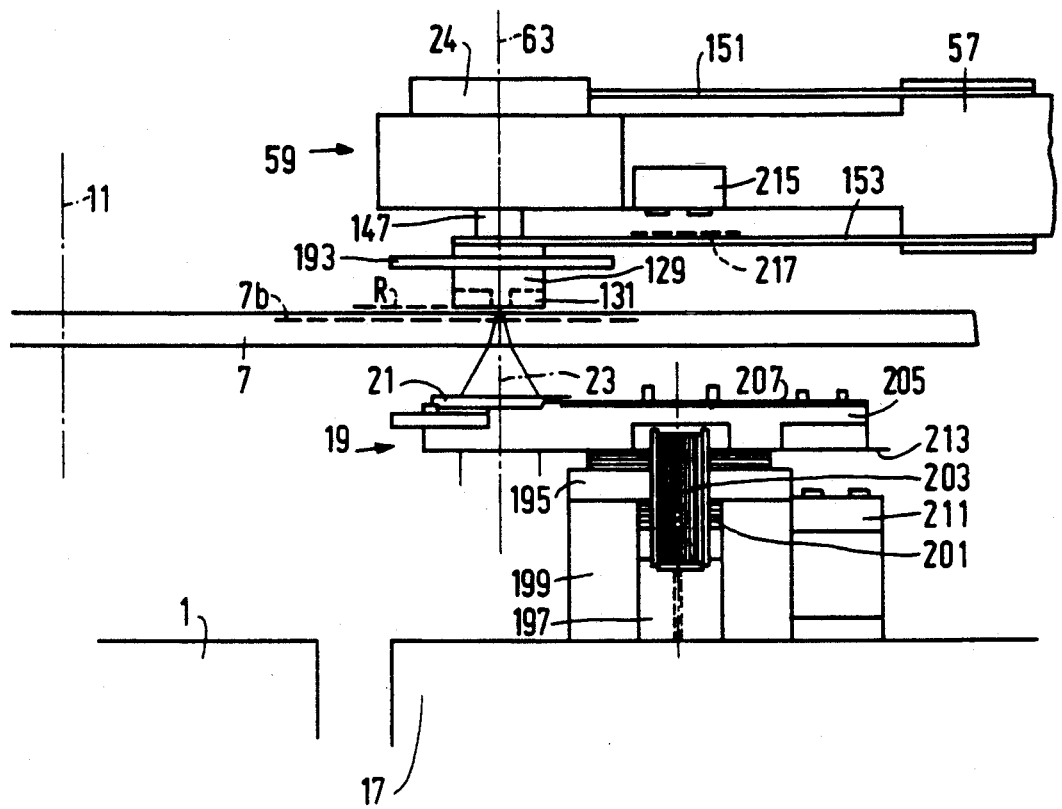
FIG. 17 is a diagrammatic longitudinal sectional view showing a part of a tenth embodiment of the device in accordance with the invention.

FIG. 17 shows a part of the tenth embodiment of the device in accordance with the invention. This embodiment is another modification of the device as shown in FIGS. 1, 2 and 3. The embodiment comprises a slide 17 carrying an optical unit 19 and a slide 57 carrying a magnetic unit 19. The slide 17 is supported in a frame corresponding to the frame of the device shown in FIGS. 1, 2 and 3, and the slide 57 is supported in a pivotable sub-frame corresponding to the sub-frame 3 in the device shown in FIGS. 1, 2 and 3. The magnetic unit 19 comprises an actuator which is similar to the actuator 24 of the device shown in FIG. 11. The actuator comprises a stationary section, which is secured directly to the slide 57, and a movable section, which is connected to the slide 57 by blade springs 151 and 153. The actuator 24 comprises an actuator spindle 147 which is movable along its longitudinal axis and which carries a magnetically shielding plate 193, suitably made of a μ-metal. The actuator spindle 147 further carries a ferrite coil former or support 129 with a coil 131 for generating a fluctuating magnetic field.

The optical unit 19 comprises an actuator 195, which comprises a stationary section, comprising with a permanent magnet 197 and a magnetic yoke 199, and a movable section, comprising with a focusing coil 201 and tracking coils 203. The movable section of the actuator 195 further comprises a supporting member 205, in which an objective 21 having an optical axis 23 is mounted. At its side which faces the magnetic unit 59 the optical unit 19 may be magnetically shielded by means of a $\mu$-metal plate 207, which is for example disc-shaped or annular.

The device shown in FIG. 17 comprises a measurement and control system comprising a sensor 211 for detecting the position of the objective 21 relative to the frame 1. The sensor 211, which in the present example is an optical distance detector, is secured to the stationary section of the actuator 195 and cooperates with a reflecting surface 213 provided on the supporting member 205 of the movable part of the actuator 195, which member is movable along the optical axis 23. The stationary section of the actuator 24 or the directly adjoining part of the slide 57 carries a further sensor 215, in the present embodiment also an optical distance detector, which cooperates with a reflecting surface 217, which in the present example is provided on the blade spring 153, which is coupled to the movable part of the actuator 24.

Figure 18:
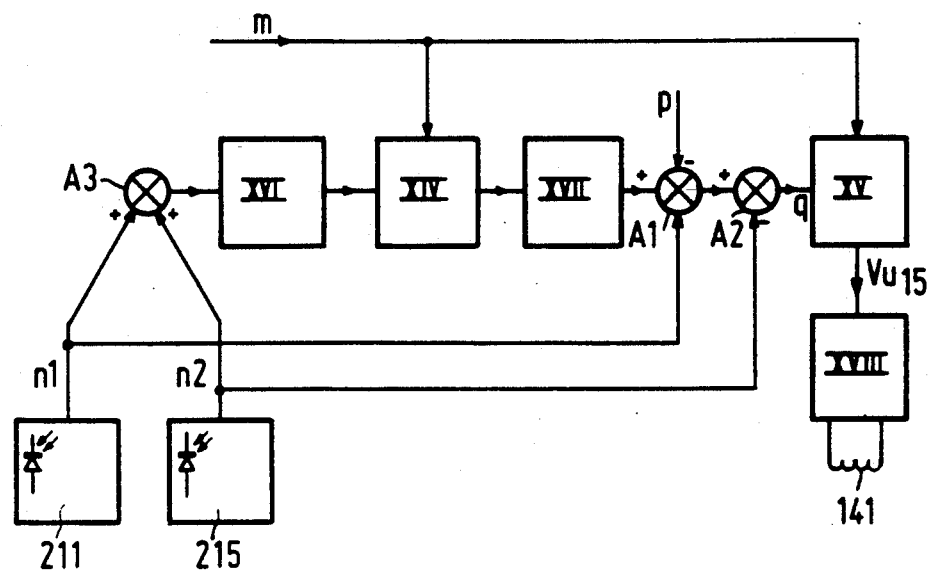
FIG. 18 shows diagrammatically the measurement and control system employed in the tenth embodiment.

The measurement and control system of the device shown in FIG. 17 will now be described in greater detail with reference to the block diagram shown in FIG. 18 and the part shown in FIG. 17. By means of a player control system, not shown, a specific routine is carried out during starting of the device. This routine may include inter alia that the objective 21 is set to a suitable focusing position and the magnetic unit 59 is briefly pressed against the information carrier 7 to be inscribed or to be read. The signal m from the player control system activates a memory XIV. Said sensors 211 and 215, which convert the distance from the reflecting surfaces 213 and 217 respectively into voltage signals n1 and n2, are connected to a controller XV and analog-to-digital converter XVI, which is coupled to the memory XIV, via adders A1, A2 and A3, in a manner as shown in the block diagram. The memory XIV is coupled to the controller XV as shown via the adders A1 and A2 and a digital-to-analog converter XVII. Moreover, a signal p, which is related to the desired value of the distance between the magnetic unit 51, in particular its reference surface R, and the magneto-optical information carrier 7, in particular its information surface 7b, is applied to the adder A1. The signal q from the adder A2 is applied to the controller XV, the controller XV ensuring that the system has the desired stability and said desired value is maintained accurately. The controller XV is connected to an output amplifier XVIII and has an output voltage Vu15. The output amplifier XVIII drives the coil 141 (see FIG. 11) of the actuator 24 of the magnetic unit 59. This enables a measurement and control system to be realised which does not make use of the rotating information carrier 7.

It is to be noted that the invention is not limited to the embodiments shown and described herein. It is obvious that further embodiments are possible within the scope of the present invention.

We claim:

1. A device for inscribing and/or reading a magneto-optical information carrier, comprising:
   a frame carrying a turntable which is rotatable about an axis of rotation and which includes a surface for supporting the information carrier,
   a slide, and an optical unit carried on the slide, said optical unit comprising an objective for concentrating a radiation beam to form at least one radiation spot in a focusing plane,
   a further slide, and a magnetic unit carried on the further slide, for generating a magnetic field which extends into said focusing plane,
   first rectilinear guide means for one of said slides, arranged on and fixed to said frame, for guiding movement of said one of said slides in a first direction parallel to the guide means,
   a subframe, and means for pivotally securing said subframe to said frame; and second rectilinear guide means for the other of said slides, mounted to said subframe, for guiding movement of said other of said slides in a second direction parallel to the second guide means, said means for pivotally securing being arranged to permit movement of the unit carried on said other of said slides in a direction substantially parallel to said axis of rotation, at least during operation said second rectilinear guide means extending parallel to the first rectilinear guide means, and
   a slide drive unit for moving said one of said slides along said first rectilinear guide means,
   characterized in that said device further comprises purely mechanical coupling means for coupling the other of said slides to said one slide, for movement therewith in said first direction during operation.

2. A device as claimed in claim 1, characterized in that said coupling means comprises a projecting member on a first of said slides, and a stop arranged on the second of said slides for mechanical engagement by said projecting member.

3. A device as claimed in claim 2, characterized in that said stop is formed by a bounding wall of an opening formed in the second of said slides.

4. A device as claimed in claim 1, characterized in that said coupling means comprises a double-hinged link having two ends, one end being directly hingedly connected to one of said slides, and the other end being directly hingedly connected to the other of said slides.

5. A device as claimed in claim 4, characterized in that at said one end the link is hingedly connected by a two-axis hinge having one hinge axis parallel to said axis of rotation, and the other hinge axis transverse to said axis of rotation and to said first direction of movement.

6. A device as claimed in claim 4, characterized in that said link comprises a respective elastic hinge at each end.

7. A device for inscribing and/or reading a magneto-optical information carrier, comprising:
   a frame carrying turntable which is rotatable about an axis of rotation and which includes a surface for supporting information carrier,
   a slide, and an optical unit carried on the slide, said optical unit comprising an objective for concentrating a radiation beam to form at least one radiation spot in a focusing plane,
   a further slide, and a magnetic unit carried on the further slide, for generating a magnetic field which extends into said focusing plane, first rectilinear guide means for one of said slides, arranged on said frame, for guiding movement of said one of said slides in a first direction parallel to the guide means, a subframe, and means for pivotally securing said subframe to said frame; a second rectilinear guide means for the other of said slides, mounted to said subframe, for guiding movement of said other of said slides in a second direction parallel to the second guide means, said means for pivotally securing being arranged to permit movement of the unit carried on said other of said slides in a direction substantially parallel to said axis of rotation, at least during operation said second rectilinear guide means extending parallel to the first rectilinear guide means, a first slide drive unit for moving said one of said slides along said first rectilinear guide means, and means for controlling movement of said one of said slides with respect to said frame, and a second slide drive unit for moving the other said slides along said second rectilinear guide means, characterized in that said device further comprises a measurement and control system for controlling said second slide drive unit, said measurement and control system being responsive to relative position of said slides with respect to each other in said first direction of movement.

8. A device as claimed in claim 7, characterized in that said measurement and control system comprises a reflecting surface arranged on a first of said slides, said surface being perpendicular to said direction of movement; and an optical distance meter arranged on the second of said slides for cooperation with said surface, said measurement and control system being responsive to a signal from said optical distance meter.

9. A device as claimed in claim 7, characterized in that said measurement and control system comprises a first incremental measurement ruler and a first optical detector disposed near the first slide drive unit, a second incremental measurement ruler and a second optical detector disposed near the second slide drive unit, and a microprocessor electronically coupling said detectors to each other.

10. A device for inscribing and/or reading a magneto-optical information carrier, comprising;

a frame carrying a turntable which is rotatable about an axis of rotation and which includes a surface for supporting the information carrier, a movable element, and an optical unit carried on the movable element, said optical unit comprising an objective for concentrating a radiation beam to form at least one radiation spot in a focusing plane, a further movable element, and a magnetic unit carried on the further movable element, for generating a magnetic field which extends into said focusing plane, first guide means for one of said movable elements, arranged on and fixed to said frame, for guiding movement of said one of said movable elements in a first direction parallel to the focusing plane, a subframe, and means for pivotally securing said subframe to said frame; a second guide means for the other of said slides, mounted to said subframe, for guiding movement of said other of said slides in a second direction parallel to the second guide means, said means for pivotally securing being arranged to permit movement of the unit carried on said other of said slides in a direction substantially parallel to said axis of rotation, at least during operation said second direction guide means extending parallel to the focusing plane, and guiding of movement of said other of said movable elements in said second direction being independent of said guiding of movement of said one movable element, and a drive unit for moving said one of said movable elements in a direction guided by the respective guide means, characterized in that said device further comprises coupling means, independent of said guide means and responsive solely to relative movement of the other said movable elements with respect to said one movable element for coupling the other of said movable elements to said one movable element for movement therewith in said first direction during operation.

11. A device as claimed in claim 10, characterized in that said coupling means comprises a projecting member on a first of said movable elements, and a stop arranged on the second of said movable elements for mechanical engagement by said projecting member.

12. A device as claimed in claim 11, characterized in that said stop is formed by a bounding wall of an opening formed in the second of said movable elements.

13. A device as claimed in claim 10, characterized in that said coupling means comprises a double-hinged link having two ends, one end being directly hingedly connected to one of said movable elements, and the other end being directly hingedly connected to the other of said movable elements.

14. A device as claimed in claim 13, characterized in that at said one end the link is hingedly connected by a two-axis hinge having one hinge axis parallel to said axis of rotation, and the other hinge axis transverse to said axis of rotation and to said first direction of movement.

15. A device as claimed in claim 13, characterized in that said link comprises a respective elastic hinge at each end.

16. A device as claimed in claim 10, comprising a second drive unit for moving the other of said movable elements along said second guide means, characterized in that said device further comprises a measurement and control system for controlling said second movable element drive unit, said measurement and control system being responsive to relative position of said movable elements with respect to each other in said first direction of movement.

17. A device as claimed in claim 16, characterized in that said measurement and control system comprises a reflecting surface arranged on a first of said movable elements, said surface being perpendicular to said direction of movement; and an optical distance meter arranged on the second of said movable elements for cooperation with said surface, said measurement and control system being responsive to a signal from said optical distance meter.

18. A device as claimed in claim 16, characterized in that said measurement and control system comprises a first incremental measurement ruler and a first optical detector disposed near the first drive unit, a second incremental measurement ruler and a second optical detector disposed near the second drive unit, and a microprocessor electronically coupling said detectors to each other.

* * * * *